Figure 1:
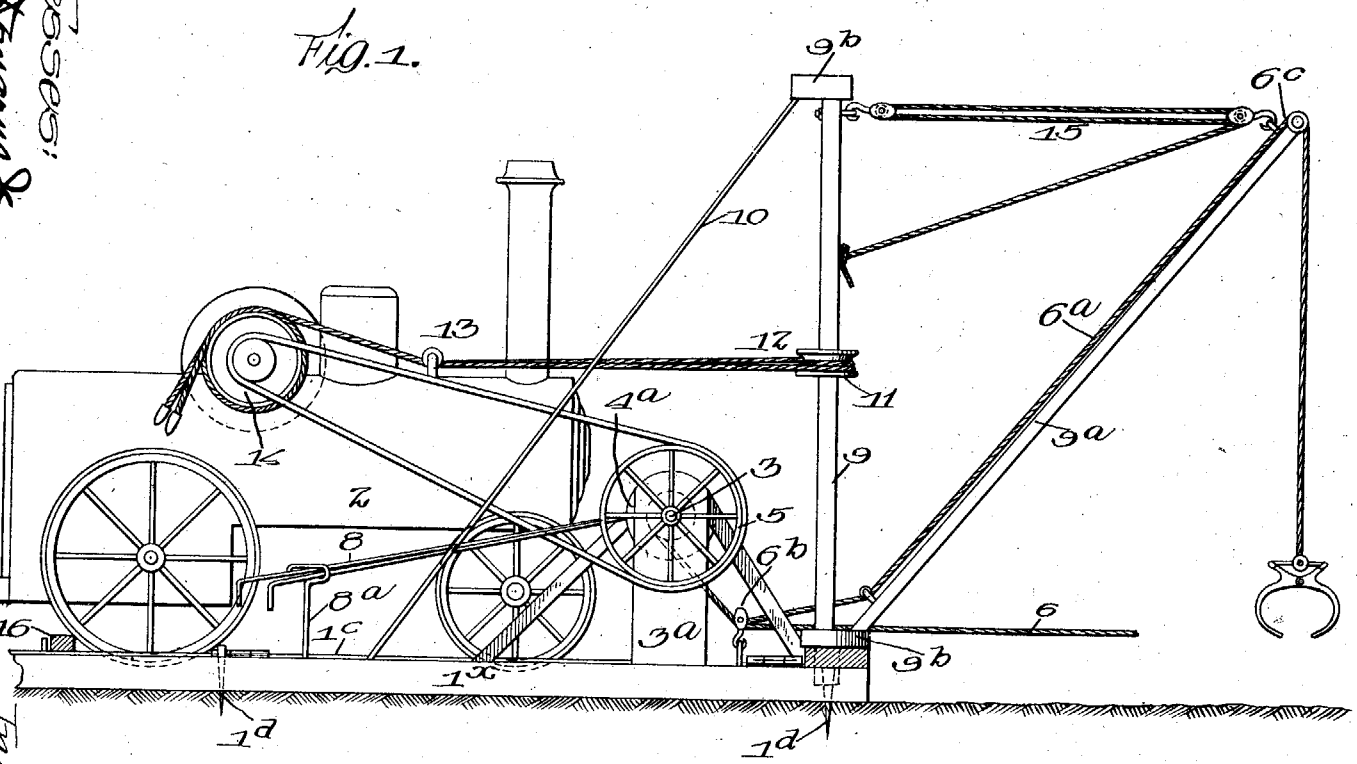

No. 12,749.

REISSUED FEB. 11, 1908.

W. M. SEYMOUR.

LAND CLEARING MACHINE.

APPLICATION FILED AUG. 15, 1907.

2 SHEETS—SHEET 1.

Witnesses:
G. V. Tomarus Jr.
Elizabeth Molter

Inventor
Wm. M. Seymour
By Coburn & McRoberts
his attys.

THE NORRIS PETERS CO., WASHINGTON, D. C.

No. 12,749. REISSUED FEB. 11, 1908.
W. M. SEYMOUR.
LAND CLEARING MACHINE.
APPLICATION FILED AUG. 15, 1907.
2 SHEETS—SHEET 2.
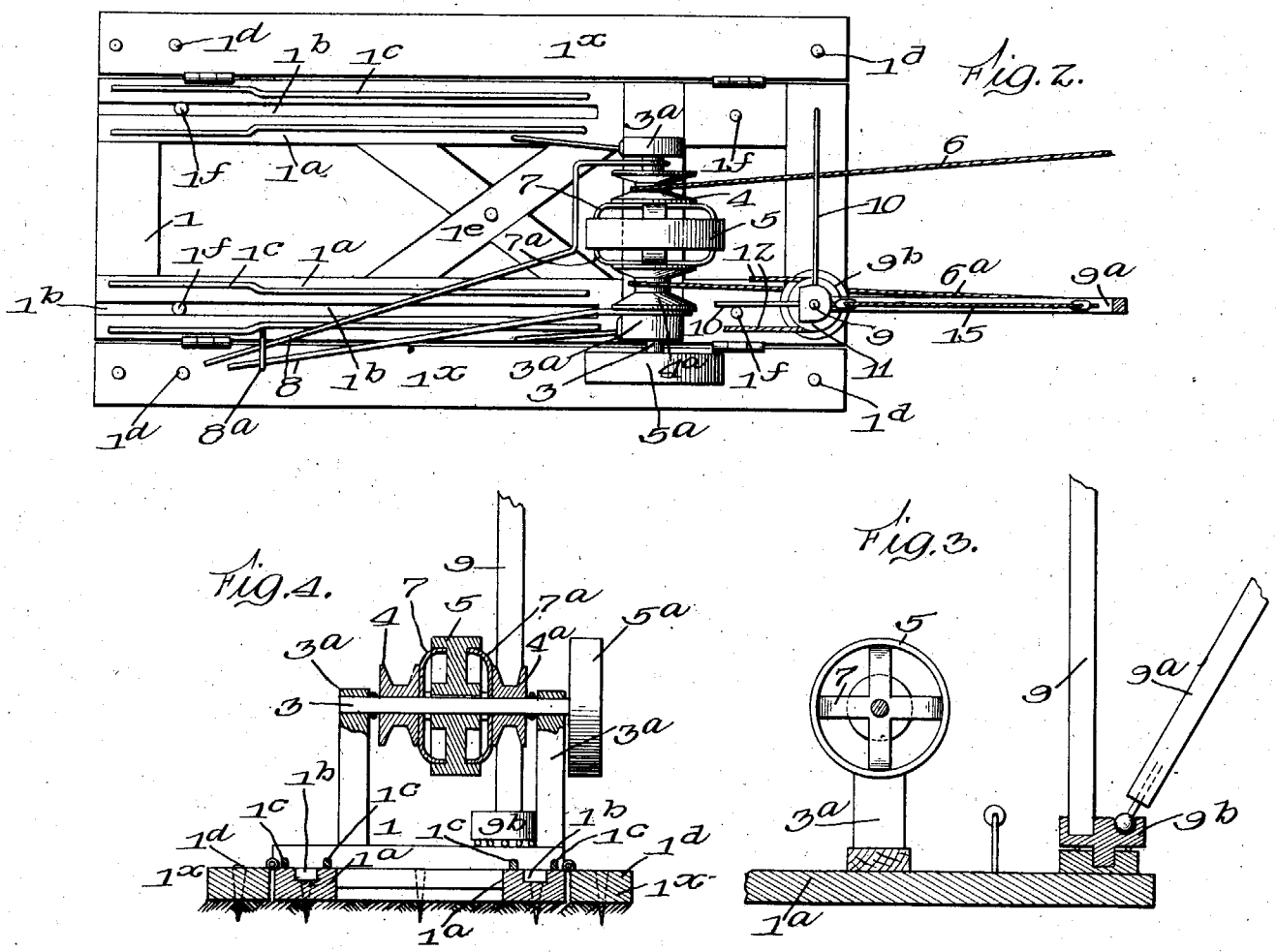
Witnesses:
G. V. Domarus Jr.
Elizabeth Molitor
Inventor,
Wm. M. Seymour
By Coburn & McRoberts
his Attys.
THE NORRIS PETERS CO., WASHINGTON, D. C.

UNITED STATES PATENT OFFICE.

WILLIAM M. SEYMOUR, OF MARSHFIELD, WISCONSIN, ASSIGNOR OF ONE-HALF TO JOHN P. HUME, OF MARSHFIELD, WISCONSIN.

LAND-CLEARING MACHINE.

No. 12,749. Specification of Reissued Letters Patent. Reissued Feb. 11, 1908.

Original No. 758,480, dated April 26, 1904, Serial No. 187,975. Application for reissue filed August 15, 1907. Serial No. 388,747.

*To all whom it may concern:*

Be it known that I, WILLIAM M. SEYMOUR, a citizen of the United States, formerly of Brookpark, in the county of Pine and State of Minnesota, but now residing at Marshfield, in the county of Wood and State of Wisconsin, have invented new and useful Improvements in Land-Clearing Machines, of which the following is a specification.

My invention relates to improvements in machines of that character designed more particularly for "clearing" land as in drawing or moving tree-stumps, logs, or other debris from different parts, say, of a field to a common point, and providing for the piling or superposing the same one upon the other for burning or other disposition.

It has for its object, among other things, to accomplish the foregoing with facility and expedition and in a simple and effective manner, by means of a machine in which the operative parts are all carried upon a frame or base which may be skidded or dragged over the ground.

Said invention consists of certain structural features and combinations and arrangement of parts substantially as hereinafter more fully disclosed in the following description and particularly pointed out by the claims concluding said description.

In the accompanying drawings, illustrating the preferred embodiment of my invention, Figure 1 is a side elevation thereof. Fig. 2 is a plan view of the same with the motor removed. Fig. 3 is a vertical longitudinal section. Fig. 4 is a transverse section looking toward the winding-drums and adjunctive parts.

In the practicing of my invention I provide a base or horizontal frame 1, whose lateral or longitudinal bars $1^a$ are provided in their upper surfaces with corresponding grooves or channels $1^b$, suitably guarded by parallel rods or guards $1^c$, secured or embedded at their ends in said lateral bars. Said grooves or channels receive and permit the resting below the upper surface of the base 1 of the motor or engine transporting and supporting wheels, as the motor—as, for instance, a traction-engine 2 is run upon said base or frame for a purpose presently seen, thus aiding to prevent the lateral displacement thereof when standing and in use thereon. Also hinged or flexibly connected to the outer longitudinal edges of base 1 are folding or wing sections $1^x$, through which may be driven spikes or stakes $1^d$ for aiding similar stakes $1^e$ $1^f$, driven centrally about through said base and through the bottoms of the channels $1^b$ in anchoring said base in position when the machine is in use. When the machine is out of use or being moved from place to place, the folding sections $1^x$ may be turned up in a vertical position or edgewise out of the way.

A horizontal shaft 3 is suitably supported or journaled in position upon suitably braced uprights or bearings $3^a$, secured to the base 1 at or near its forward end. Upon said shaft are arranged loose cable-winding drums 4 $4^a$. Also fixed upon said shafts are pulleys 5 $5^a$, one adapted to be belted to a driving-pulley of the motor or traction-engine 2 for actuating said shaft, while the other pulley, 5, is adapted to be frictionally connected up with either of the cable-winding drums 4 $4^a$ for separately actuating the same as may be required and as will presently appear. Said winding-drums have suitably secured thereto the inner ends or terminals of cables or lines 6 $6^a$, one of which cables is also adapted to be connected at its opposite end to the object to be drawn or moved along the surface or ground, and the other cable suitably passed over pulleys $6^b$ $6^c$, arranged, respectively, upon the base 1 and the swinging beam of the derrick, as will appear later.

Frictional shipping devices or clutches 7 $7^a$ of any usual or approved construction are arranged upon the shaft 3, connected up with the winding-drums 4 $4^a$, respectively, and adapted to be separately engaged laterally with opposite sides of the pulley 3, acording to the drum it may be required to put in motion. Said shipping devices or clutches are actuated by suitably-fulcrumed levers 8, with their inner ends so connected to the former as to effect the requisite engagement between said clutches and drums, while the distant or opposite ends of said levers rest in upstanding guides or keepers $8^a$, suitably secured in place and within convenient reach of the operator or attendant for their ready actuation. Said cable-winding drums may be adapted to be engaged for their retention as against the unwinding or slackening of the cables by suitably-hung gravity pawls or dogs engaging notches or ratchet-surfaces produced in said drums, as commonly practiced in this class of apparatus.

An upright shaft 9 with a laterally-swinging beam $9^a$, after the fashion of the ordinary derrick, is suitably positioned in an axial or pivot casting $9^b$ upon the base or frame 1, at the forward end thereof, the upper pivot or axial bearing of said shaft being suitably braced or held in position, preferably by rods or braces 10, secured in said bearing and in the base 1, respectively, as shown, or otherwise. Upon said shaft intermediately of its ends is suitably fixed a horizontal pulley 11, connected to and around which are coiled or wound a number of times in opposite directions lines or cables 12 12, passed back over guide-pulleys or idlers 13, suitably supported in position to and each coiled or wound one or more times around a driving-pulley 14 of the motor or engine, said lines or cables having their ends freely depending or hanging therefrom for convenience of grasping or engagement by the hand of the operator. By this arrangement it will be seen that by engaging or tightening either of the lines or cables around its respective driving-pulley or drum the pulley 11 may be so actuated as to rotate or turn the shaft 9 either to the right or left, according to the direction in which it may be required to swing the beam $9^a$ in bringing into requisition the cable $6^a$ with its attached grapple, as in hoisting or elevating the stumps, logs, or other objects pulled or drawn up to the machine by the aforesaid appliances for piling one upon the other for burning or other disposition, as above noted.

To guard against the involuntary rearward movement or displacement of the motor or engine wheels, a cross-bar or chock 16 is suitably secured temporarily to the base 1, at the rear end thereof.

It is obvious that an organization comprising the various operating parts mounted or carried on the frame or base constitutes a unitary device capable of being skidded or dragged over the ground from place to place, so that the entire mechanism for drawing and piling stumps etc. may be thus moved over the field.

Latitude is allowed as to details herein, as they may be changed according to circumstances without departing from the spirit of my invention and said invention still be protected.

What I claim is:—

1. In a machine of the character described, a base having longitudinal wheel-receiving channels or grooves and equipped with rods or guards secured to said base at their ends, parallel with said grooves.

2. In a machine of the character described, a base having lateral hinged or folding sections provided with anchoring-stakes adapted to be driven into the surface or ground.

3. In a machine of the character described, a suitably mounted and actuated shaft carrying a fixed pulley, winding-drums loose upon said shaft and equipped with clutches adapted to laterally engage said fixed pulley, manually-actuated means for effecting such engagement of said clutches, a motor suitably arranged with relation to said shaft, cables connected to and coiled upon said winding-drums, an upright shaft, with its swinging beam, pivotally mounted in position and carrying a horizontal pulley, additional cables oppositely actuating said horizontal pulley and connected to additional actuating drums or pulleys of said motor, with their drum-actuated end portions adapted to be manually tightened around said drums or pulleys.

4. In a machine for pulling and piling stumps, a skidding-frame, a shaft on the frame carrying a fixed pulley, a motor on the frame connected to the shaft, winding drums loosely mounted on the shaft, clutches to connect the drums to the fixed pulley, manually-actuated means to operate the clutches, cables connected to the drums, an upright shaft with its swinging beam pivotally mounted on the frame, one of the cables running from its drum to the field, and the other running from its drum over a pulley on the beam, the frame and associated parts being adapted to be skidded over the ground.

5. In a machine for pulling and piling stumps, a skidding-frame, a shaft on the frame, a motor on the frame connected to the shaft, winding drums mounted on the frame, means to connect the drums to the shaft, cables connected to the drums, an upright shaft with its swinging beam pivotally mounted on the frame, one of the cables running from its drum to the field, and the other from its drum over a pulley on the beam, the frame and associated parts being adapted to be skidded over the ground.

6. In a machine for pulling and piling stumps, a frame, a shaft on the frame, a motor on the frame to actuate the shaft, winding drums mounted on the frame, means to connect the drums to the shaft, cables connected to the drums, an upright shaft with its swinging beam pivotally mounted on the frame, one of the cables running from its drum to the field, and the other running from its drum over a pulley on the beam, the said frame and associated parts being adapted to be skidded over the ground.

In testimony whereof I have signed my name to this specification in the presence of two subscribing witnesses.

WILLIAM M. SEYMOUR.

Witnesses:

HARLOW HYDE,
HUGO WEGENER.